United States Patent [19]
Hall, Jr. et al.

[11] 3,820,494
[45] June 28, 1974

[54] CHAIN STOPPER

[75] Inventors: George B. Hall, Jr., Torrance; Joseph E. Stevens, Arcadia, both of Calif.

[73] Assignee: Global Marine Inc., Los Angeles, Calif.

[22] Filed: Apr. 18, 1973

[21] Appl. No.: 352,276

[52] U.S. Cl. .............................. 114/200, 114/218
[51] Int. Cl. ........................................ B63b 21/18
[58] Field of Search ................ 114/199, 200, 218; 254/150 R, 175.7, 175.5; 188/82.3, 82.9, 170; 192/12 B

[56] References Cited
UNITED STATES PATENTS

| | | | |
|---|---|---|---|
| 2,927,669 | 3/1960 | Walerowski | 188/170 |
| 3,270,705 | 9/1966 | Roeggen | 114/218 |
| 3,352,152 | 11/1967 | Abraham | 254/150 R |
| 3,422,941 | 1/1969 | Fredell | 192/12 B |
| 3,456,767 | 7/1969 | Hollnagel et al. | 188/170 |
| 3,507,477 | 4/1970 | Sandy et al. | 114/218 |
| 3,712,431 | 1/1973 | Versoy | 254/150 R |

FOREIGN PATENTS OR APPLICATIONS

| | | | |
|---|---|---|---|
| 15,696 | 11/1900 | Great Britain | 188/82.9 |

Primary Examiner—Duane A. Reger
Assistant Examiner—Galen L. Barefoot
Attorney, Agent, or Firm—Christie, Parker & Hale

[57] ABSTRACT

There is described a chain stopper for the anchor chain of a ship in which the chain passes around the pulley of a fairlead. One surface of the pulley extending perpendicular to the axis of rotation is provided with a plurality of lugs which may be engaged or disengaged by a plurality of dogs which are integral with a plate movable along the axis of rotation of the fairlead pulley by a pneumatic piston. The plate is movably supported on a pair of guides which are located on either side of the fairlead. Springs normally urge the plate into position in which the lugs and dogs are engaged to prevent rotation of the fairlead pulley.

2 Claims, 4 Drawing Figures

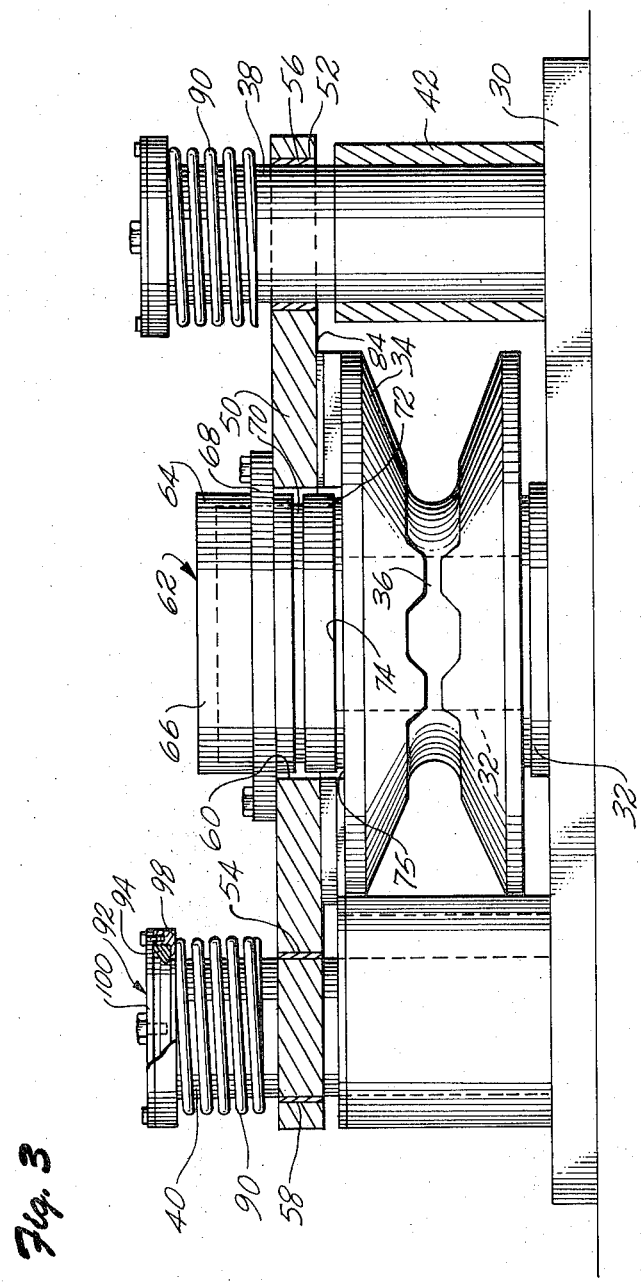

CHAIN STOPPER

FIELD OF THE INVENTION

This invention relates to a chain stopper for a ship's anchor chain and more particularly to a chain stopper which can be released while the anchor and anchor chain are pulling against the chain stopper.

BACKGROUND OF THE INVENTION

In the typical anchor installation in a large ship, an anchor chain made up of a plurality of forged links extends from the anchor through a hawse pipe in the hull of the ship and extends around the "wildcat" of a winch into the anchor chain locker. The anchor is raised and lowered by the winch, which plays out or pulls up the anchor chain. Since the winch usually only has a friction brake, it is desirable to lock the chain in position by means of a chain stopper. Typically the chain stopper is in the form of a pin or similar device which can be inserted in the opening in one of the links and extends outwardly so as to bridge the opening in the hawse pipe, thereby preventing the chain from feeding out through the hawse pipe under the pull exerted by the anchor on the anchor chain.

The problem with such conventional chain stoppers is that in order to release the chain stopper, the winch must be operated to back off the anchor chain sufficiently to remove any load from the chain stopper pin. Ships used for providing a floating drilling base at sea may have as many as eight such anchor chains extending outwardly at different positions from the ship to maintain the ship's position during the drilling operation. The use of conventional chain stoppers under such circumstances has proved troublesome.

SUMMARY OF THE PRESENT INVENTION

The present invention is directed to an improved chain stopper arrangement which is capable of positively locking the anchor chain so as to remove all tension from the winch, while at the same time providing a chain stopper which can be readily released without transferring the load of the anchor chain back to the winch.

This is accomplished in brief by utilizing the pulley of a fairlead around which the anchor chain is guided in passing from the winch to the hawse pipe. Guide members anchored on either side of the fairlead movably support a plate having a plurality of dogs which engage radially positioned lugs formed on one surface of the pulley. A pneumatic piston moves the plate along the guide members in a direction away from the pulley so as to disengage the dogs from the lugs and permit free rotation of the pulley in the fairlead. Spring means normally urges the movable plate and dogs into engagement with the lugs of the pulley.

BRIEF DESCRIPTION OF THE DRAWINGS

For a more complete understanding of the invention, reference should be made to the accompanying drawings, wherein:

FIG. 3 is a sectional view taken substantially on the line 2—2 of FIG. 2; and

DETAILED DESCRIPTION

Figure 1:
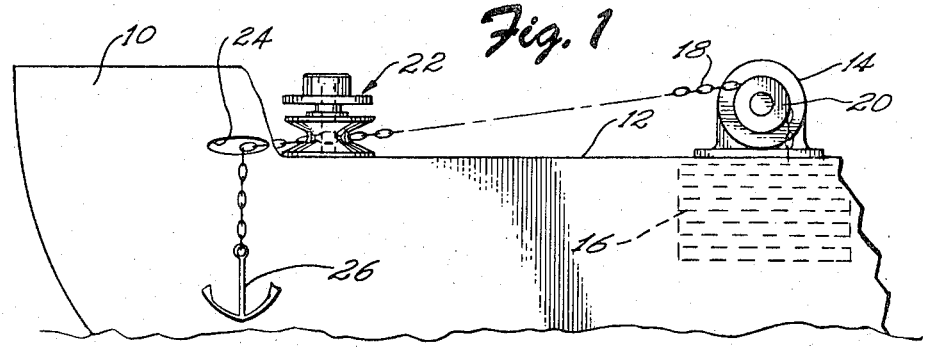
FIG. 1 shows a typical anchor installation on a ship.

Referring to FIG. 1, the numeral 10 indicates a portion of the bow of a ship. The ship includes a deck 12 on which is mounted a winch 14. The winch is arranged to play out the anchor chain from a chain locker 16 by running the anchor chain 18 around a "wildcat" 20 driven by the winch 14. The chain 18 is directed around a chain stopper, indicated generally at 22, and constructed according to the features of the present invention, the chain then passing through a hawse pipe 24 in the gunwale of the ship to an anchor 26.

Figure 2:
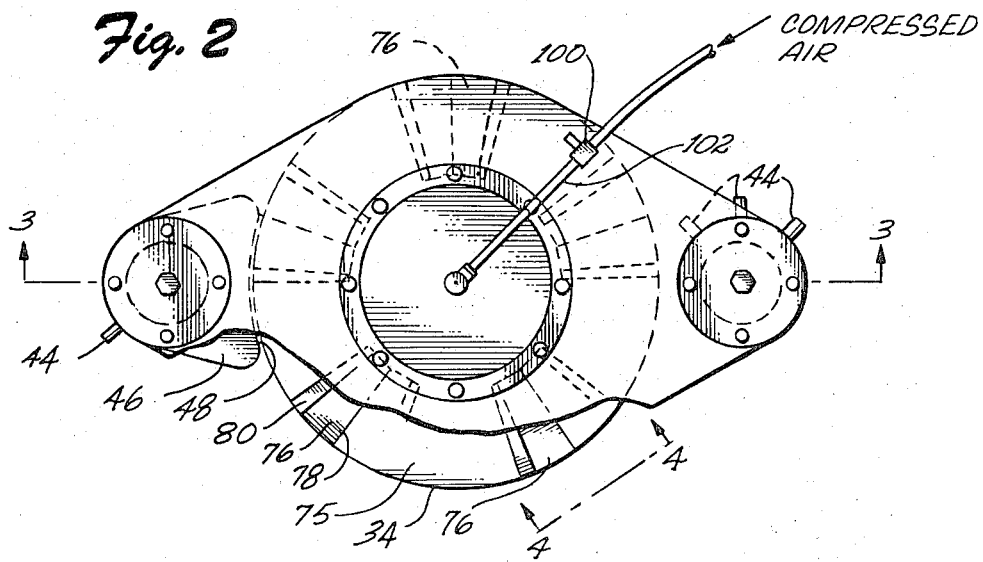
FIG. 2 is a plan view of the modified fairlead incorporating the features of the present invention.
Figure 4:
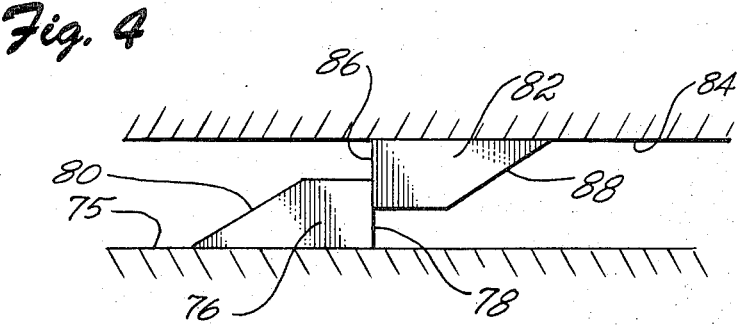
FIG. 4 is a partial view showing the details of the engaging lugs and dogs.

The details of the chain stopper 22 may be better understood by reference to FIGS. 2–4. The chain stopper assembly includes a base 30. Mounted on the base 30 is a vertical shaft 32 on which is journaled a pulley 34. The pulley 34 is designed with a central V-shaped groove running around the periphery for receiving the anchor chain. The bottom of the groove is formed with a series of notches 36 which positively engage the links of the anchor chain to provide a driving relationship between the anchor chain and the pulley 34. As thus far described, the apparatus comprises a conventional fairlead commonly used for directing the anchor chain between the winch and the hawse pipe of a ship.

Positioned on diametrically opposite sides of the pulley 34 are a pair of vertical guide shafts 38 and 40 which are anchored at their lower ends in the base 30. The shaft 38 may be more securely held by the addition of a sleeve 42 and a group of outwardly extending fillets 44 which add strength and stiffness to the shaft 38 in resisting lateral forces resulting from the twisting movement applied by the anchor chain. The shaft 40 is similaraly provided with a sleeve 46 which is shaped, as seen in FIG. 4, to provide an arcuate guide surface 48 concentric with the outer edge of the pulley 34 to prevent the anchor chain from jumping out of the groove in the pulley 34.

Bridging the space between the guide shafts 38 and 40 is a locking plate 50 having spaced openings 52 and 54 with sleeve bearing inserts 56 and 58, respectively. The sleeves provide a bearing surface which slidably engages the guide shafts 38 and 40 to permit vertical movement of the locking plate 50. The locking plate 50 has a large central opening 60 whose center is aligned with the axis of rotation of the pulley 34. A pneumatic actuator, indicated generally at 62, is mounted in the opening 60. The pneumatic actuator includes an outer cylinder 64 and closed end wall 66. The cylinder 64 is provided with a circumferential flange 68 which is bolted or otherwise secured to the top of the locking plate 50 around the periphery of the opening 60.

The actuator 62 further includes a piston 70 which slidably fits inside the cylinder 64. The lower end of the piston 70 is provided with a pad 72 that presses against the top 74 of the shaft 32 on which the pulley 34 is journaled. Thus the actuator 62 when pressurized by compressed air, for example, operates to lift the locking plate 50 vertically relative to the pulley 34.

The pulley 34 is provided with a substantially flat end surface 75 to which is secured a plurality of radially extending lugs 76. The lugs are welded, bolted or otherwise secured to the surface 75 and, as best seen in FIG. 5, are each provided with a radially extending face 78 which is perpendicular to the surface 75 of the pulley 34. Each lug is also provided with a radially extending beveled surface 80. The locking plate 50 is provided with a plurality of mating radially extending dogs 82 which are welded or otherwise secured to the bottom surface 84 of the plate 50. Each of the dogs 82 has a radially exending surface 86 perpendicular to the surface 84 and a beveled surface 88. The lugs 76 and dogs 82 are circumferentially spaced such that the surfaces 78 and 86 meet in abutting relationship when the pulley 34 is rotated in a counterclockwise direction as viewed in FIG. 2. The clockwise direction of the pulley 34 causes the beveled surfaces 80 and 88 to engage, wedging the plate 50 upwardly and permitting the dogs 82 to slip over the top of the lugs 76 on the pulley 34. Operation of the actuator 62 causes the locking plate 50 to be lifted sufficiently for the dogs 82 to be moved vertically out of engagement with the lugs 76.

To insure that the locking plate 50 is forced downwardly to permit engagement of the dogs with the lugs, compression springs 90 are provided which fit over the guide shafts 38 and 40 respectively and are positioned above the locking plate 50. The upper end of each of the compression springs 90 engages a shoulder formed by a retainer assembly 92 secured to the top of each guide shaft. The retainer assembly includes a split ring 94 that has an inwardly projecting ridge around the inner circumference which engages a corresponding groove around the upper end of the respective guide shafts 38 and 40. The split ring 94 is held in position by an outer backup ring 98 and a cover plate 100. The cover plate is bolted or otherwise secured around its periphery to the outer ring 98 and at its center to the top of the associated guide shaft.

As best seen in FIG. 2, air from a compressed air source (not shown) is directed through a valve 100 and pipe 102 to the actuator 62. The same valve 100 may also be used to exhaust the air to the atmosphere through the same pipe 102.

From the above description it will be seen that a chain stopper is provided which also functions as the fairlead for guiding the anchor chain. The full tension load of the anchor imposed by the anchor on the chain is transferred to the pulley 34 through the lugs 76 to the dogs 82 and through the locking plate 50 and guide shafts 38 and 40 to the deck of the vessel. The chain stopper is designed to sustain chain tension loads of as high as 70 tons and still be releasable without first transferring this load to the winch. The size of the pneumatic actuator is such as to provide over 25,000 pounds of lift on the locking plate 50, using compressed air pressures of 100 psi. The beveled back surfaces 80 and 88 of the lugs and dogs insure that the chain stopper operates to resist tension only from the anchor end of the chain and not from the winch end of the chain. This is a safety feature to prevent undue loading on the winch if it is operated without first releasing the locking plate.

What is claimed is:

1. A chain stopper for an anchor chain comprising a base, a central shaft secured at its bottom end to the base, a grooved pulley rotatably journaled on the shaft and having a top end extending away from the base, the anchor chain being adapted to pass around a portion of the pulley in the groove, a pair of guide shafts secured at one end to the base on either side of the pulley, a stop member having a lower surface adjacent the top end of the pulley and slidably engaging the two guide shafts, the stop member extending across the top of the central shaft, relatively moveable mating lug means on the top end of the pulley and on the lower surface of the stop member, spring means urging the stop member toward the top end of the pulley to bring the respective lug means into engagement, the lug means having beveled surfaces to wedge the stop member away from the pulley when the pulley is rotated in one direction, and substantially vertical surfaces that engage to lock pulley and stop member when the pulley is rotated in the opposite direction, and release means positioned between the stop member and the central shaft for pushing the stop member away from the pulley to disengage the lug means, the release means including a pneumatic actuator having a cylinder mounted on the stop member and a position engaging the unsupported end of said shaft, the actuator when pressurized pushing the stop member away from the pulley in a direction parallel to the axis of rotation.

2. Apparatus of claim 1 wherein: one of the guide shafts includes means forming an arcuate guide surface concentric with the pulley for holding the chain in the pulley groove.

* * * * *